UNITED STATES PATENT OFFICE.

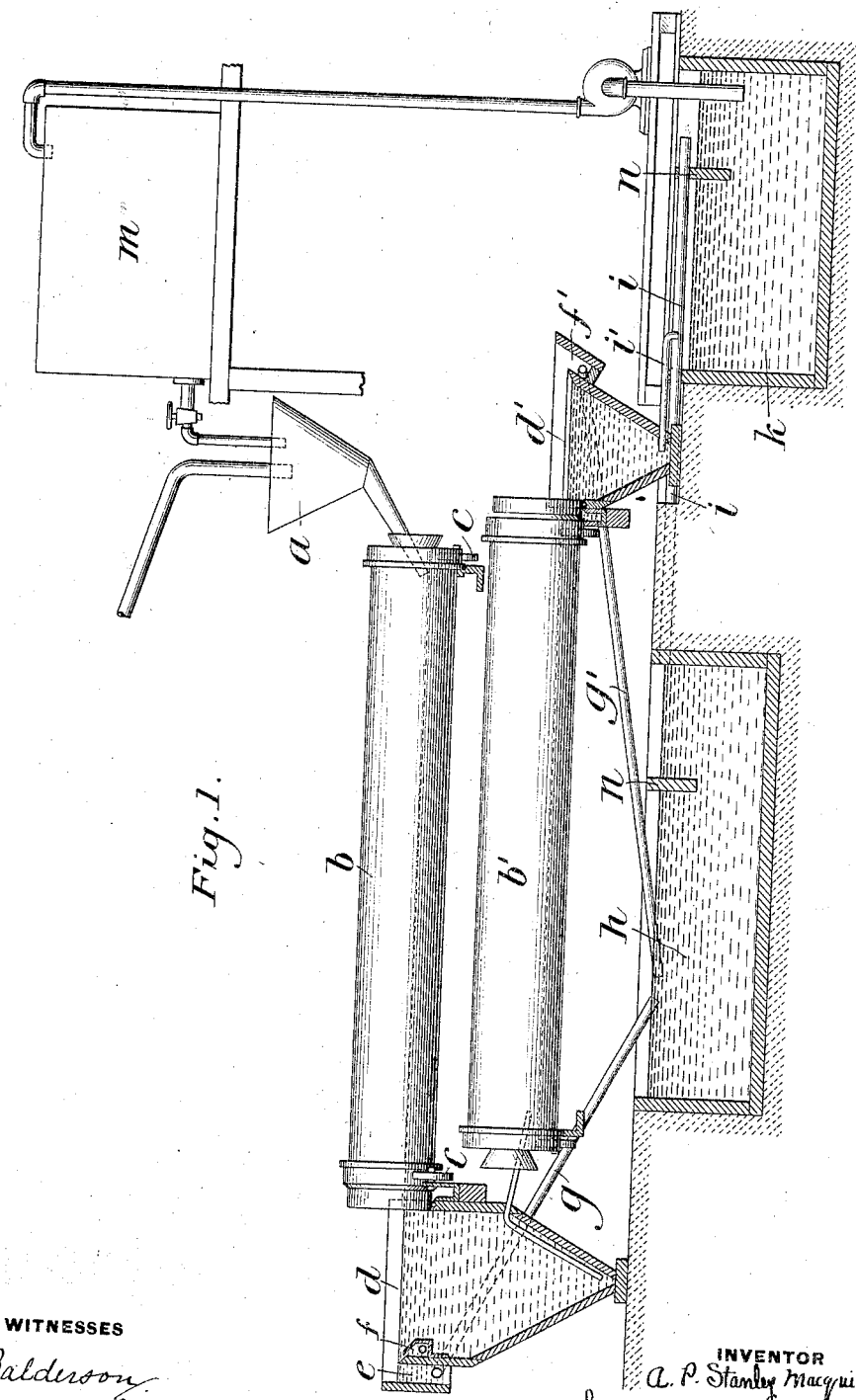

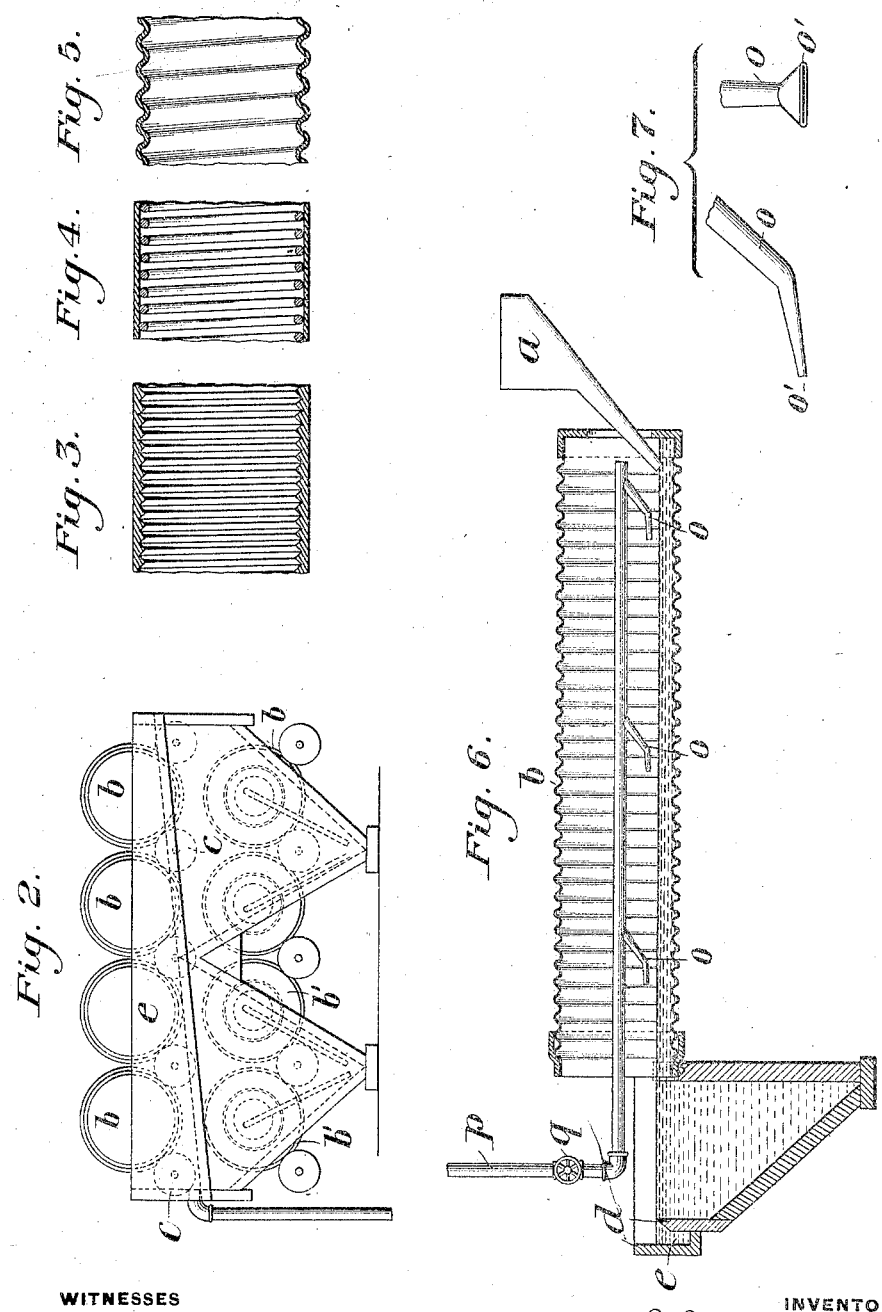

ARTHUR P. STANLEY MACQUISTEN, OF GLASGOW, SCOTLAND.

APPARATUS FOR SEPARATING SOLID PARTICLES FROM EACH OTHER.

No. 865,195.  Specification of Letters Patent.  Patented Sept. 3, 1907.

Application filed March 17, 1906. Serial No. 306,588.

*To all whom it may concern:*

Be it known that I, ARTHUR P. STANLEY MACQUISTEN, of Glasgow, Scotland, N. B., have invented certain new and useful Apparatus for Separating Solid Particles from Each Other, of which the following is a specification, reference being had to the accompanying drawing, forming a part of the specification, in which—

Figure 1 is a side elevation of my apparatus partly in section; Fig. 2 is an end elevation thereof; Figs. 3, 4 and 5 are sectional views of various forms of the cylindrical separating device; Fig. 6 is a vertical sectional view of the cylinder, showing the means employed for directing air currents on the surface of the liquid; and Fig. 7 shows in side and front elevation the air nozzle which I preferably employ for this purpose.

My invention relates to an apparatus for separating solid particles of different characters in a mixture of such particles, and is more particularly designed for the separation of the metalliferous particles from the gangue of crushed or finely divided ore.

The principle which underlies my invention is the fact that some substances, when conveyed through the surface of a liquid, are more readily retained at or on that surface than other substances, due to their different surface affinities for liquid, and that consequently in a mixture of such substances those which are more readily retained at or on the surface can, on account of such property, be separated by flotation from those which are not, and which therefore sink into the body of the liquid. Thus when the particles of a suitable pulverized mineral-bearing ore, immersed in water or other liquid and mixed so as to form a pulp, are caused to pass through the surface of such liquid by a conveyer or other means, the metallic or metalliferous particles, if of suitable size, will be retained at the liquid surface by the tension of the surface film, while the gangue will not be so retained. The separted metalliferous particles constituting the concentrates can then be floated away, by causing a surface current, for example, and collected or deposited in any convenient manner, while the gangue is otherwise dealt with.

The water or other liquid which is utilized in the process may have its properties modified in respect of surface tension or capillarity, particularly in regard to the mineral matter to be separated, by means of any effective chemical or physical agency, or substances or matter may be added to or dissolved in the liquid with the object of modifying or altering the chemical or physical conditions of the surface of the particles to be separated, or the material to be treated may be subjected to a prior treatment with the same object.

In the arrangement shown, the crushed metalliferous ore or pulp is fed into a hopper *a* which conveys it, together with the water or other liquid through whose agency the separation is effected, into a cylindrical vessel *b* suitably mounted as on rollers *c* to be rotated about its axis, which may be horizontal or slightly inclined thereto. The feed end of the vessel is partially closed to enable a suitable depth of liquid to be maintained, while the delivery end opens into a tank *d* with the wall of which it makes a liquid-tight joint.

Part or the whole of the edge of the tank *d* is at the liquid level and constitutes a weir over which a continuous stream passes to the launder *e*. Preferably, in order to facilitate the passage of the liquid-borne particles over the weir, an annular channel *f* is provided round its inner edge, supplied with liquid under pressure and having a suitable narrow opening round its upper edge by which such liquid is directed towards and over the lip of the weir.

The launder is connected by a pipe *g* with a settling tank *h* which in turn is connected by pipe *i* with a collecting tank *k* for the liquid which is thence pumped to the elevated storage tank *m*, whence it passes gravitationally through a suitable regulating cock to the hopper *a* to be used over again.

The contents of the tank *d* may be treated in a similar manner to the original mixture of ore and liquid in a second separating vessel *b'* situated at a lower level, into which the material is fed, by the pressure of the superincumbent liquid, through a pipe extending to the bottom of the tank *d*. The material passes from the vessel *b'* to a tank *d'* over the edge of which the liquid-borne particles and the liquid fall into the launder *f'*, whence it is conveyed by pipe *g'* to the settling tank *h*. A pipe *i'* connects the tank *g'* with the collecting tank *k*.

The tanks *h* and *k* are preferably provided with transverse hanging partitions *n* which prevent continuous surface streams along the tanks and assist the deposit of the solid particles, the deposit being collected from the tanks at suitable intervals, or removed by conveyers or other suitable means.

The separating vessels *b*, *b'* may be arranged in batteries, as shown in Fig. 2, and if necessary more than two series of these may be employed.

The rotation of the separating vessels brings the mixture of metalliferous particles and gangue supported thereby up through the liquid surface, where they become subject to the action of capillary forces with the result that the metalliferous particles are thereby retained at the surface of the liquid and float away with the stream, whereas the gangue particles slide back and again subside in the liquid. As the particles emerge above the surface of the liquid, owing to the steep angle at which they are carried which is greater than the angle of repose of the mass, they roll back upon and over the ascending mass, so that fresh metalliferous particles are repeatedly exposed to the action of the surface and are caused to float, this operation being effected very often and so gently by the rotation of the cylinder that a very thorough separation takes place. The liquid stream flowing through the vessel in a transverse direction carries both classes of particles with it, the one on the surface and the other in the body of the liquid, the latter being collected in a suitable vessel as described, and the former being deposited in another vessel by agitation of the particles or the liquid or other suitable means. In some cases it may be preferable to convey the gangue particles in the direction opposite to that of the flow of the metalliferous particles.

The particles which adhere on emergence from the liquid to the surface of the separating vessel, or the film of liquid covering it, are carried round and returned to the liquid level, and in the process of submergence the metalliferous particles are floated off by the stream, while the gangue particles are carried downwards or subside into the body of the liquid.

The effective surface of the separating vessel may be increased by forming it with internal corrugations, and if these are spirally arranged, they serve to convey the submerged particles bodily through the vessel. Thus Fig. 3 shows a separating vessel having an internal screw-thread; Fig. 4 a spiral coil inside the vessel, and Fig. 5 a spiral corrugation. Further, it is obvious that any suitable mechanical device may be used for the purpose of bringing the particles up to or through the liquid surface.

The pulverized material may be first classified into conveniently graded products, which are then separately treated as above described, or the smaller mineral particles are first separated according to the process of the present invention, leaving the coarser particles to be dealt with in any suitable known manner.

The surface stream may be accelerated by suitable means, such as by directing an air-blast along its surface in the direction of travel. Such an arrangement is shown in Figs. 6 and 7, in which nozzles $o$ presenting narrow horizontal slits or orifices $o'$ close to the surface of the liquid in the vessel $b$ and directed substantially in the direction of the stream of flow of the liquid, communicate with a supply-pipe $p$ leading to any suitable source of compressed air and having a valve or cock $q$, by which the jets of air may be regulated to produce any desired velocity of current.

Usually water would be employed as the separating agent in the case of metalliferous ores, but obviously any liquid may be substituted therefor, which has the suitable constitution or properties to effect the separation in the manner herein described, or the properties of the water or other liquid with respect to its surface tension or capillarity may be modified by the addition of a suitable acid, or alkali or soluble salt or other substance. The surface condition of the particles to be separated may be modified or altered by suitable treatment with active chemicals which will attack the surface of the particles. In any case, however, the mixed particles are brought together through the liquid surface and the separation is effected at the surface by the molecular forces within the range of which the particles are thus brought and by virtue of which some particles are maintained suspended at or on the liquid surface film, while others are not.

The liquid surface may be the surface of separation between the liquid and a gas, vapor or liquid, and would in general be the surface between the liquid and air.

My apparatus as shown in the drawing may be modified in many respects by those skilled in the art, both as to form number and arrangement of the parts, the essential feature being the provision of a support rotatable in contact with a body of liquid and passing through the surface of the liquid in such direction as to carry the particles therethrough and to cause them to roll back to the surface of the liquid.

I claim:

1. Means for separating a mixture of finely divided particles of ore, comprising a cylinder arranged to rotate in contact with a body of liquid, said cylinder passing through the surface of the liquid in such direction as to carry the particles therethrough and to cause them to roll back to the surface of the liquid, said cylinder having a ribbed interior surface.

2. Means for separating a mixture of finely divided particles of ore, comprising a cylinder arranged to rotate in contact with a body of liquid, said cylinder passing through the surface of the liquid in such direction as to carry the particles therethrough and to cause them to roll back to the surface of the liquid, said cylinder having a helically ribbed interior surface.

3. Means for separating a mixture of finely divided particles of ore, comprising a support for said particles arranged to move in contact with a body of liquid, said support passing through the surface of the liquid in such direction as to carry the particles therethrough and to cause them to roll back to the surface of the liquid, and means for creating a surface current of the liquid.

4. Means for separating a mixture of finely divided particles of ore, comprising a support for said particles arranged to move in contact with a body of liquid, said support passing through the surface of the liquid in such direction as to carry the particles therethrough and to cause them to roll back to the surface of the liquid, and means for creating a surface current of the liquid, said means consisting of blast devices by which a current of air is projected over the surface of the liquid.

In testimony whereof, I have hereunto set my hand.

A. P. STANLEY MACQUISTEN.

Witnesses:
THOMAS W. BAKEWELL,
GEORGE H. SONNEBORN.